United States Patent [19]

Osborn

[11] Patent Number: 6,026,293
[45] Date of Patent: Feb. 15, 2000

[54] SYSTEM FOR PREVENTING ELECTRONIC MEMORY TAMPERING

[75] Inventor: William R. Osborn, Cary Wake, N.C.

[73] Assignee: Ericsson Inc., Research Triangle Park, N.C.

[21] Appl. No.: 08/706,574

[22] Filed: Sep. 5, 1996

[51] Int. Cl.[7] .................... H04L 9/28; H04L 9/30; H04Q 7/32

[52] U.S. Cl. .................... 455/411; 455/418; 380/4; 380/25; 380/30; 711/164

[58] Field of Search .................... 455/410, 411, 455/418, 419; 711/163, 164; 395/186; 380/4, 25, 30

[56] References Cited

U.S. PATENT DOCUMENTS

| | | | |
|---|---|---|---|
| 4,405,829 | 9/1983 | Rivest et al. | 380/30 |
| 4,748,668 | 5/1988 | Shamir et al. | 380/30 |
| 4,811,377 | 3/1989 | Krolopp et al. | 455/550 |
| 5,046,082 | 9/1991 | Zicker et al. | 455/419 |
| 5,142,579 | 8/1992 | Anderson | 380/30 |
| 5,153,919 | 10/1992 | Reeds, III et al. | 380/44 |
| 5,204,902 | 4/1993 | Reeds, III et al. | 380/23 |
| 5,224,160 | 6/1993 | Paulini et al. | 380/4 |
| 5,237,612 | 8/1993 | Raith | 380/23 |
| 5,282,250 | 1/1994 | Dent et al. | 380/23 |
| 5,343,527 | 8/1994 | Moore | 380/4 |
| 5,384,847 | 1/1995 | Henrickson et al. | 380/23 |
| 5,386,468 | 1/1995 | Akiyama et al. | 380/4 |
| 5,400,389 | 3/1995 | Niiyama et al. | 455/418 |
| 5,442,645 | 8/1995 | Ugon et al. | 371/25.1 |
| 5,442,706 | 8/1995 | Kung | 380/30 |
| 5,475,758 | 12/1995 | Kikuchi | 380/25 |
| 5,551,073 | 8/1996 | Sammarco | 455/411 |
| 5,606,315 | 2/1997 | Gaskins | 380/4 |
| 5,737,701 | 4/1998 | Rosenthal et al. | 455/411 |

FOREIGN PATENT DOCUMENTS

| | | |
|---|---|---|
| 0 583 100 | 2/1994 | European Pat. Off. . |
| 2681965 | 4/1990 | France . |
| WO91/09484 | 12/1990 | WIPO . |

OTHER PUBLICATIONS

Preneel, B., "Cryptographic Hash Functions" European Transactions on Telecommunications and Related Technologies, vol. 5, No. 4, pp. 17–34, Jul. 1994.

"Mobile Station–Base Station Compatibility Standard for Dual–Mode Wideband Spread Spectrum Cellular System", TIA/EIA/IS–95–A, Sections 2.3.12.1 through 2.3.12.1.9, Telecommunications Industry Association (May 1995).

B. Schneier, *Applied Cryptography*, John Wiley & Sons, Inc., pp. 291–296, 321–346 (1994).

*Primary Examiner*—Andrew M. Dolinar
*Attorney, Agent, or Firm*—Burns, Doane, Swecker & Mathis, L.L.P.

[57] ABSTRACT

Methods and apparatus for preventing tampering with memory in an electronic device, such as a cellular telephone, are disclosed. An electronic device having a memory and a processing means contains logic that is used to perform a one-way hash calculation on the device's memory contents whereby an audit hash value, or signature, of such contents is derived. The audit hash value is compared to a an authenticated valid hash value derived from authentic memory contents. A difference between the audit and valid hash values can be indicative of memory tampering. In accordance with another aspect of the invention, electronic device memory contents can be updated by a data transfer device that is authenticated before being permitted access to the memory contents. Data transfer device authentication involves the use of a public/private key encryption scheme. When the data transfer device interfaces with a electronic device and requests memory access, a process to authenticate the data transfer device is initiated.

50 Claims, 12 Drawing Sheets

SYSTEM FOR PREVENTING ELECTRONIC MEMORY TAMPERING

BACKGROUND

The invention relates to a system for preventing electronic memory manipulation, and in particular, to methods and apparatuses for preventing unauthorized manipulation of desirably secure memory contents in an electronic device.

The invention disclosed herein relates to any electronic device whose memory contents are to be maintained in a secure or preferably unaltered state. Such a requirement may be necessitated by security reasons, such as preventing fraudulent manipulation of a cellular telephone memory, or for the purposes maintaining the integrity of electronic device operation in critical applications such as aircraft control or medical instrument operation. As disclosed and described herein, exemplary aspects of the invention are set out in the context of a system and method for securing one or more electronic memories within a cellular telephone. Also described herein is a system that permits access to, and manipulation of, one or more electronic memories in an electronic device, by use of a data transfer device that undergoes an authentication process before being permitted to access an electronic memory. The latter system also is described in the context of a cellular telephone application. Even though exemplary embodiments of the invention disclosed herein are described in the context of a secure cellular telephone memory and a means for securely accessing and altering memory contents in a cellular telephone, it will be readily appreciated by those skilled in the art that systems in accordance with the invention can be applied to any electronic system having one or more memories whose contents are to remain unaltered, or whose memories are to be accessed only by authorized means. Consequently, the scope of the invention is not intended to be limited by the exemplary embodiments set out herein, but rather by the claims appended hereto and equivalents thereof.

In the United States, losses due to cellular telephone fraud were projected at 600 million dollars in 1995. In response, manufacturers, service providers, the Federal Communications Commission (FCC) and industry trade groups have been investigating a number of techniques for combating such fraud. A majority of cellular telephone fraud carried out in the U.S. involves some form of memory manipulation to alter a cellular telephone's electronic serial number (ESN) which a cellular telephone must provide to establish communication. Consequently one fraud prevention technique, under consideration as a ruling by the FCC, is to require cellular telephone manufacturers to make all microprocessor code and the ESN unalterable. Some background on basic cellular communications is provided below to assist in illustrating the cellular telecommunications operating environment and associated problems that are addressed by systems incorporating the present invention.

A simplified layout of a cellular communications system is depicted in FIG. 1. Mobile telephones M1–M10 communicate with the fixed part of a public switched network by transmitting radio signals to, and receiving radio signals from, cellular base stations B1–B10. The cellular base stations B1–B10 are, in turn, connected to the public switched network via a Mobile Switching Center (MSC). Each base station B1–B10 transmits signals within a corresponding area, or "cell" C1–C10. As depicted in FIG. 1, an idealized arrangement of base stations are organized so that the cells substantially cover an area in which mobile telephone communication ordinarily occurs (e.g., a metropolitan area), with a minimum amount of overlap.

When a user activates a mobile telephone within a cell, the mobile telephone transmits a signal indicating the mobile telephone's presence to the cell's base station. The mobile telephone transmits the signal, which may include its ESN, in a designated set-up channel that is continuously monitored by each base station. When the base station receives the mobile telephone's signal, it registers the mobile telephone's presence within the cell. This process can be :repeated periodically so that the mobile telephone is appropriately registered in the event that it moves into another cell.

When a mobile telephone number is dialed, a telephone company central office recognizes the number as a mobile telephone and forwards the call to the MSC. The MSC sends a paging message to certain base stations based on the dialed mobile telephone number and current registration information. One or more of the base stations transmits a page on its set-up channel. The dialed mobile telephone recognizes its identification on the set-up channel, and responds to the base station page. The mobile telephone also follows an instruction to tune to an assigned voice channel and then initiates ringing. When a mobile user terminates a communication, a signaling tone is transmitted to the base station, and both sides release the voice channel.

In the aforedescribed operation, mobile telephones are not connected permanently to a fixed network but instead, communicate through a so-called "air interface" with a base station. This, of course, provides the flexibility of cellular communication systems, since a user can readily transport a mobile telephone without the restriction of being physically linked to a communication system. This same feature, however, also creates difficulties with respect to securing information transmitted over cellular telephone systems.

For example, in ordinary wired telephone systems, a central office exchange can identify a particular subscriber to be billed for use of a telephone set by the communication line to which it is physically attached. Thus, fraudulent use of a subscriber's account typically requires that a physical connection be made to the subscriber's line. This presents a risk of discovery to a would-be fraudulent user.

Cellular telecommunication systems, on the other hand, pose no such connection problem for the would-be fraudulent user since these systems communicate over an air interface. Absent protection schemes, fraudulent users can use another subscriber's account by accessing the subscriber's electronic serial number (ESN) which is transmitted by the mobile telephone to the network at various times for establishing and maintaining communications.

In establishing a standard cellular connection, two identification codes are transmitted by a mobile telephone to the system. These are the Mobile Identification Number (MIN) and the ESN. The MIN identifies a subscriber, while the ESN identifies the actual hardware being used by the subscriber. Accordingly, it is expected that the MIN corresponding to a particular ESN can, due to subscribers purchasing new equipment, change over time. The MIN is a 34-bit binary number derived from a 10-digit directory telephone number, while the ESN is a 32-bit binary number that uniquely identifies a mobile telephone. The ESN is typically set by the mobile telephone manufacturer.

A conventional authentication method utilized in setting up communications in, for example, the Advanced Mobile Phone System (AMPS), is illustrated by the flowchart depicted in FIG. 2. Accord'ing to this method, a base station receives both an ESN and a MIN from the mobile telephone at block 200. These identification codes are designated ESN$_m$ and MIN$_m$ to indicate that they are received from the mobile telephone. Next, at block 202 the base station retrieves an ESN$_{sys}$ which corresponds to MIN$_m$ from a system memory. ESN$_{sys}$ is then compared with ESN$_m$ at block 204. If the two serial numbers are the same, the flow proceeds to block 206 and system access is permitted. Otherwise, system access is denied at block 208.

One drawback to this system is that it is relatively simple for a fraudulent user to assemble valid MIN/ESN combinations by eavesdropping on the air interface or from other sources. Since accesses according to this conventional system are presumed valid if the MIN and ESN received from the mobile telephone correspond with those stored in system memory, all of the necessary information for fraudulent access can be obtained by electronic eavesdropping.

In systems operating under the European GSM standard (Global System for Mobile Communication), the American TIA/EIA/IS-136 standard and the Japanese Personal Digital Cellular standard radio communication systems, fraud resulting from eavesdropping is prevented by using a challenge-response method. According to the challenge-response method, each mobile telephone is associated with a unique secret key that is stored both in the mobile telephone and in a database in the network. An algorithm, which is unique to the system, is stored in each mobile telephone and in desired network nodes. When a call is set up, authentication is requested whereby the network sends a challenge (random number) to the mobile telephone. Based on the received challenge and the stored secret key, the mobile telephone calculates a response using the algorithm and transmits the response to the network. Simultaneously, the network calculates an "expected" response based on the same challenge and network-stored secret key. The network then receives the mobile telephone's calculated response and compares the mobile telephone's calculated response with the network's calculated response. If a mismatch occurs, appropriate actions will take place, e.g., access is denied or a warning flag is set. A method for carrying out an authentication check between a base station and a mobile telephone in a mobile radio system is set out in U.S. Pat. No. 5,282,250 to P. Dent et al.

In a conventional analog system, such as AMPS, most fraud is perpetrated by fraudulent users who "clone" valid subscribers by acquiring valid MIN/ESN pairs and using the pairs to reprogram a cellular telephone. In more sophisticated cloning arrangements, a cellular telephone's software is reprogrammed with so that it can use several MIN/ESN pairs in a practice called "tumbling." A cellular telephone programmed with a tumbling routine randomly scrolls through and selects a MIN/ESN pair to initiate a call. As the fraud is identified by the service provider or subscriber, the MIN/ESN pairs are invalidated. When an invalid MIN/ESN pair is encountered when attempting to make a call, the tumbling routine simply cancels that MIN/ESN pair and continues scrolling until a valid MIN/ESN pair is found. After all of the MIN/ESN pairs programmed into the cellular telephone are invalidated, the telephone user typically returns to the cloner to have a new set of MIN/ESN pairs programmed into the cellular telephone.

Most cellular fraud involves some degree of memory manipulation. This is described in reference to FIG. 3 which depicts a block diagram of a conventional cellular telephone memory and processor arrangement. A controller 300 communicates with a ROM or flash program memory 320, an EEPROM 310, and a random access memory (RAM) 330, using a memory bus 308. The program memory 320 is a non-volatile read/write memory theat is used to store the majority of code used for general operation of the cellular telephone. The EEPROM 310 is used to store the MIN/ESN pair 314 and 316, and user profile information 312 (e.g., speed dialing numbers) and the RAM is used for read/write scratchpad memory. Cloners have been known to monitor messaging between the memories and the controller 300 to gather information that is used to bypass or modify information stored in the flash memory 320 or the EEPROM 310.

The most common method of telephone fraud has been the illegitimate use of test commands, which commands are intended for telephone servicing and repair, to change the ESN. However, more recently produced telephones are resistant to such tampering and have effectively eliminated this avenue of attack. Consequently, cloners have resorted to more sophisticated modes of attack.

One such technique involves removing the original EEPROM 310 containing the ESN 314 and replacing it. Following its removal, the EEPROM is studied to decipher its contents. The deciphered contents are then used to program a replacement EEPROM with a misappropriated ESN/MIN pair from a valid user's account. This technique may be attractive to the cloner if he or she only wants to change one ESN at one time. But the technique is labor intensive and poorly skilled cloners may damage printed circuits if not extremely careful.

A large step in cloning sophistication involves analyzing a telephone's microprocessor program code and rewriting one or more sections of the code to transmit a fraudulent identity (ESN/MIN pair) to a cellular base station. This often involves reverse engineering portions of the telephone hardware design, and requires significant understanding of imbedded software design. The obvious advantage of this method, however, is that once the modification is complete, the telephone can be reprogrammed with a new identity as often as desired.

The most sophisticated attacks combine alterations of the cellular telephone's microprocessor code as described above, in combination with hardware modification. One example of this technique uses a so-called "shadow memory" to avoid detection by conventional memory validation routines which only execute during the boot-up process when the cellular telephone is first turned on. The boot-up process is carried out pursuant to a small portion of boot code 304 contained in the controller 300 (see FIG. 3) The boot-up process configures the cellular telephone into an in-service condition and sets a program counter in the microprocessor 301 to an appropriate location in the flash memory 320. When the process is complete, the controller 300 may illuminate an LED 318 (or other equivalent signal) indicating to a user that the telephone is in service. A cloner can monitor a connection 306 between the controller 300 and the LED 318 to subvert the execution of normal operating code in the flash memory 320 as described in more detail as follows.

The flash memory 320 contained in a typical modern cellular telephone has an addressable capacity of 512K. A cloner may remove the flash memory 320, and replace it with a 1024K shadow memory 322 after copying the contents of the original flash memory 320 into the first 512K of the 1024K shadow memory 322. During boot-up, any accesses to program memory are successfully directed in the first 512K of the flash memory 320. The cloner may then monitor a signal available in the telephone which indicates the boot process is complete (such as the LED signal 306) in order to switch all future program memory accesses to the shadow memory 322. Thereafter the cellular telephone operates in accordance with instructions found in the shadow memory 322 which memory can be programmed to contain tumbling routine code and corresponding MIN/ESN pairs.

Because most cellular fraud is based on some degree of memory manipulation, the Federal Communications Commission (FCC) is presently considering a solution directed to this aspect of cellular telephone fraud. The solution is incorporated in a proposed FCC Rule designated § 22.219. As presently written, § 22.919 prohibits a mobile telephone's operating software from being alterable; requires an ESN to be factory set and incapable of being altered, transferred, removed or manipulated in any manner; and requires the mobile transmitter to become inoperable if any party, including a manufacturer, attempts to remove, tamper with or change the ESN, the system logic, or firmware of the cellular telephone.

From a consumer's standpoint, the present ability of a manufacturer or its factory authorized service representatives to program cellular telephones makes it easy to replace cellular telephones that are not operating properly. For example, if a subscriber's cellular telephone is not operating properly, the subscriber can obtain a new unit from a factory authorized representative and have it programmed to contain the same electronic "personality" of the old unit. The electronic personality of a cellular telephone includes not only the ESN, but also the user profile and a substantial amount of information programmed into the unit by the subscriber such as personal and/or business telephone numbers. Repair/replacement programs and the technology to make quick and easy ESN and other memory changes to cellular telephones have been developed at the insistence of cellular service providers who do not want their subscribers to be inconvenienced by defective terminals.

Under FCC § 22.919 a subscriber in the situation described above will still be able to obtain a new mobile unit if their old unit is defective. However, because a new, fixed ESN will be associated with the new unit, the new ESN information will have to be communicated to the cellular carrier who will have to program it into their database. This can result in a lengthy period of time during which the subscriber will not have service. The subscriber will also have to reprogram their cellular telephone with any personal or business telephone numbers. A much more significant problem with § 22.919 is the adverse impact it will have on the ability of cellular service providers to furnish their subscribers with system upgrades by programming or re-programming of their cellular telephones.

The practical impact § 22.919 may have on the cellular industry's ability to upgrade systems is demonstrated as follows. The use of a digital control channel as specified, for example, in the TIA/EIA/IS-136 standard, enables cellular carriers to offer new extended services such as a short messaging service. If carriers, manufacturers or authorized agents are allowed to make changes to the software and/or firmware of a cellular telephone, such services can be made available to subscribers quickly and efficiently through software upgrades of the terminals. Under § 22.919 (in its present form), neither a manufacturer, a manufacturer's authorized service representative nor a cellular carrier will be able to make such software changes. The only way a carrier will be able to offer a subscriber a system enhancement will be to require the subscriber to purchase a new cellular telephone.

To ameliorate the impact of § 22.919 on subscribers as well as on the manufacturing community, the FCC stated that the rule would be applicable to cellular telephones for which applications for initial type acceptance were filed after Jan. 1, 1995. In effect, the FCC has grandfathered the 20 million cellular telephones currently in operation as well as the millions of cellular telephones placed in service after Jan. 1, 1995, based upon applications for type acceptance filed prior to Jan. 1, 1995. The fact that there are so many cellular units already in the marketplace whose electronic information can be manipulated for illegal purposes suggests that § 22.919 will have very little impact on the fraud problem. Those entities who commit fraud by illegally tampering with ESNs can continue to do so by using the millions of terminals that are not subject to the § 22.919 restrictions.

As can be appreciated from the foregoing, provision of a cellular telephone having a secure memory is highly desirable. At present there appear to be no solutions for retrofitting cellular telephones to make them resistant to tampering. In addition there appear to be no methods or apparatuses for providing updates to electronic device memories in such a way that only authorized access is ensured.

SUMMARY

These and other drawbacks and limitations of conventional methods and proposed solutions for preventing cellular telephone memory tampering, and electronic memory tampering generally, are overcome by the present invention, exemplary embodiments of which protect electronic memory contents from unauthorized access and manipulation.

In accordance with one aspect of the invention, security is achieved by periodically auditing electronic memory contents in an electronic device to ensure that the contents have not been tampered with. The audit involves performing a hash calculation over selected contents of the electronic memory to derive an audit hash value, or audit signature, of such contents. The audit hash value is compared with a valid hash value previously derived from authentic memory contents. The valid hash value is preferably stored in an encrypted form within an electronic memory and decrypted only for purposes of comparison. A disparity between the audit hash value and the valid hash value can indicate memory tampering, wherefore an electronic device containing the electronic memory can be rendered inoperative, or a warning indication can be made.

In accordance with another aspect of the invention, electronic memory contents, such as those contained in a cellular telephone memory (including the cellular telephone's ESN), can be updated by a data transfer device that is authenticated before being permitted access to the memory contents. Data transfer device authentication involves the use of a public/private key authentication scheme. When the data transfer device interfaces with the electronic device and requests access, the electronic device initiates a process to authenticate the data transfer device. This can involve exchanging a series of messages between the electronic device and the data transfer device. A public key is maintained within the electronic device that is used to decrypt a message encrypted, or "signed" with a secret private key maintained within the data transfer device. More particularly, when the data transfer device requests to program the electronic device, an authentication process is initiated. The electronic device responds by sending a challenge message back to the data transfer device. The challenge message is signed with a digital signature using the private key maintained in the data transfer device. The signed challenge message is sent back to the electronic device which authenticates it using the public key. Once authenticated, the data transfer device is permitted access to privileged commands and capabilities in the electronic device.

Following any reprogramming of an electronic memory, the electronic device performs a hash calculation to derive a new (valid) hash value on the modified memory contents. The new hash value is returned to the data transfer device for a digital signature by the private key. The signed new hash value is returned to the electronic device for storage. When the electronic device performs a subsequent memory audit, the resulting audit hash value is compared to the new valid hash value.

BRIEF DESCRIPTION OF THE DRAWINGS

The foregoing and other objects, features and advantages of the present invention will be more readily understood upon reading this description in conjunction with the drawings, in which.

DETAILED DESCRIPTION

An exemplary electronic memory involving apparatuses and methods in accordance with the invention is disclosed below in the context of a cellular telephone application. The examples described below are merely provided to illustrate an ideal application incorporating the invention.

Figure 1:
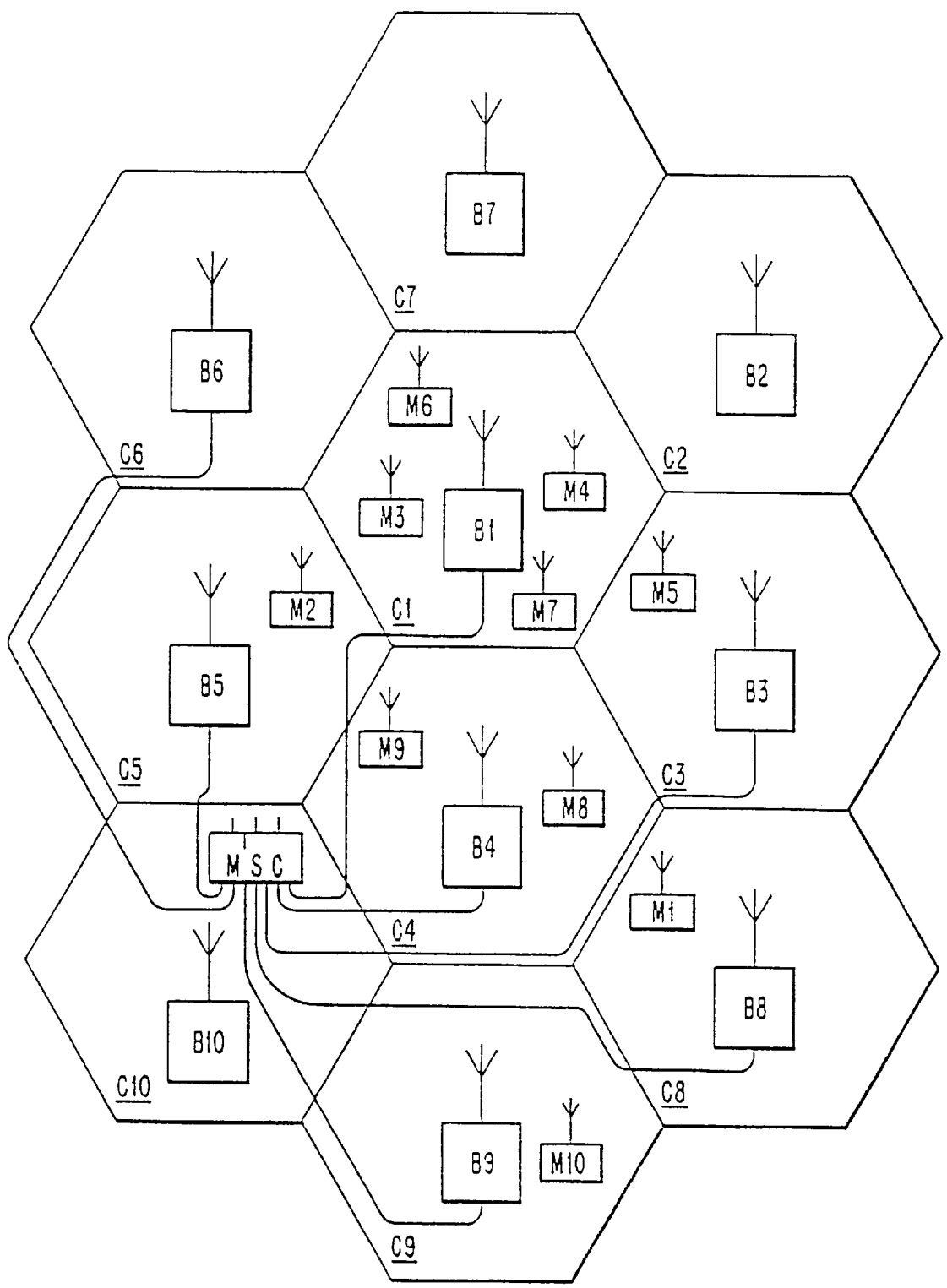
FIG. 1 depicts an idealized layout of a cellular communications system.
Figure 2:
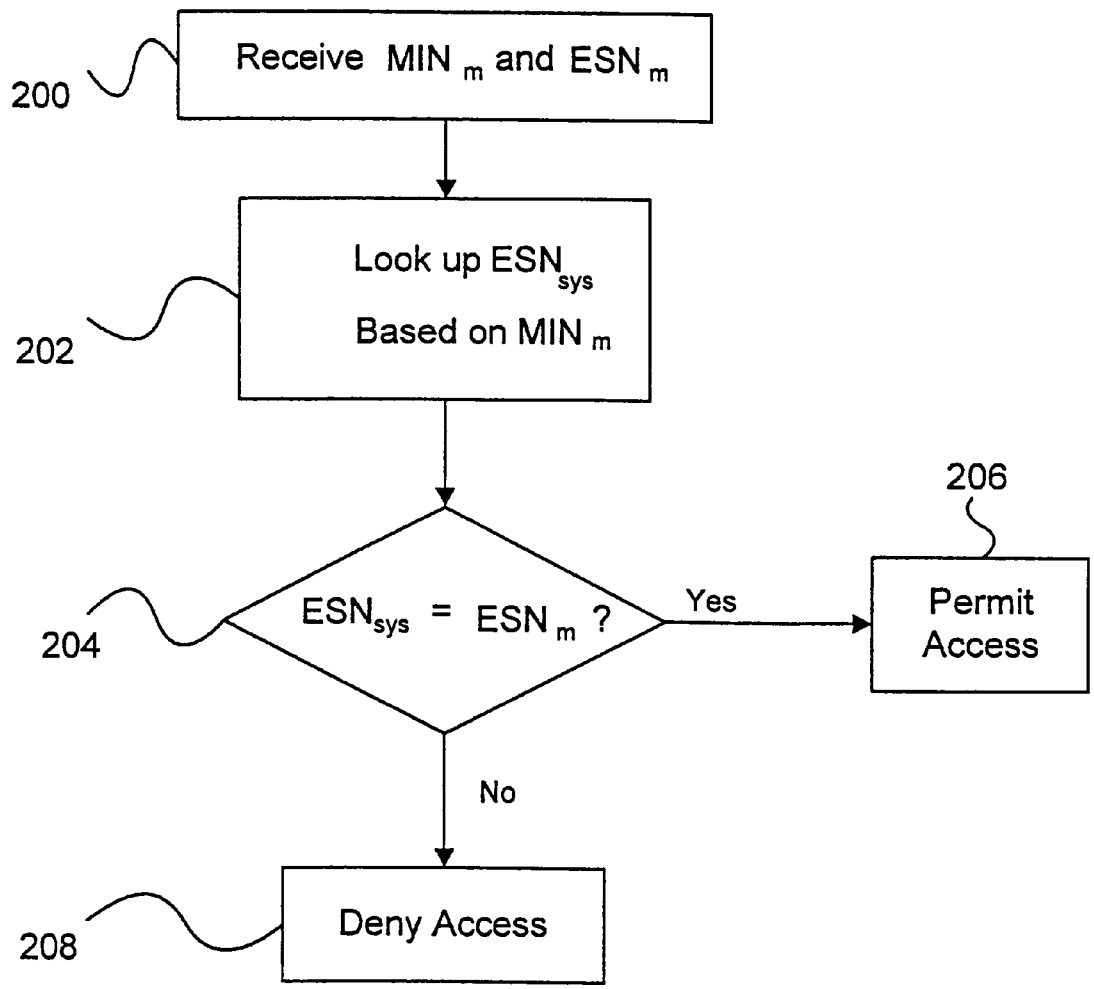
FIG. 2 depicts a flow diagram illustrating a conventional cellular authentication method for setting up a cellular call.
Figure 3:
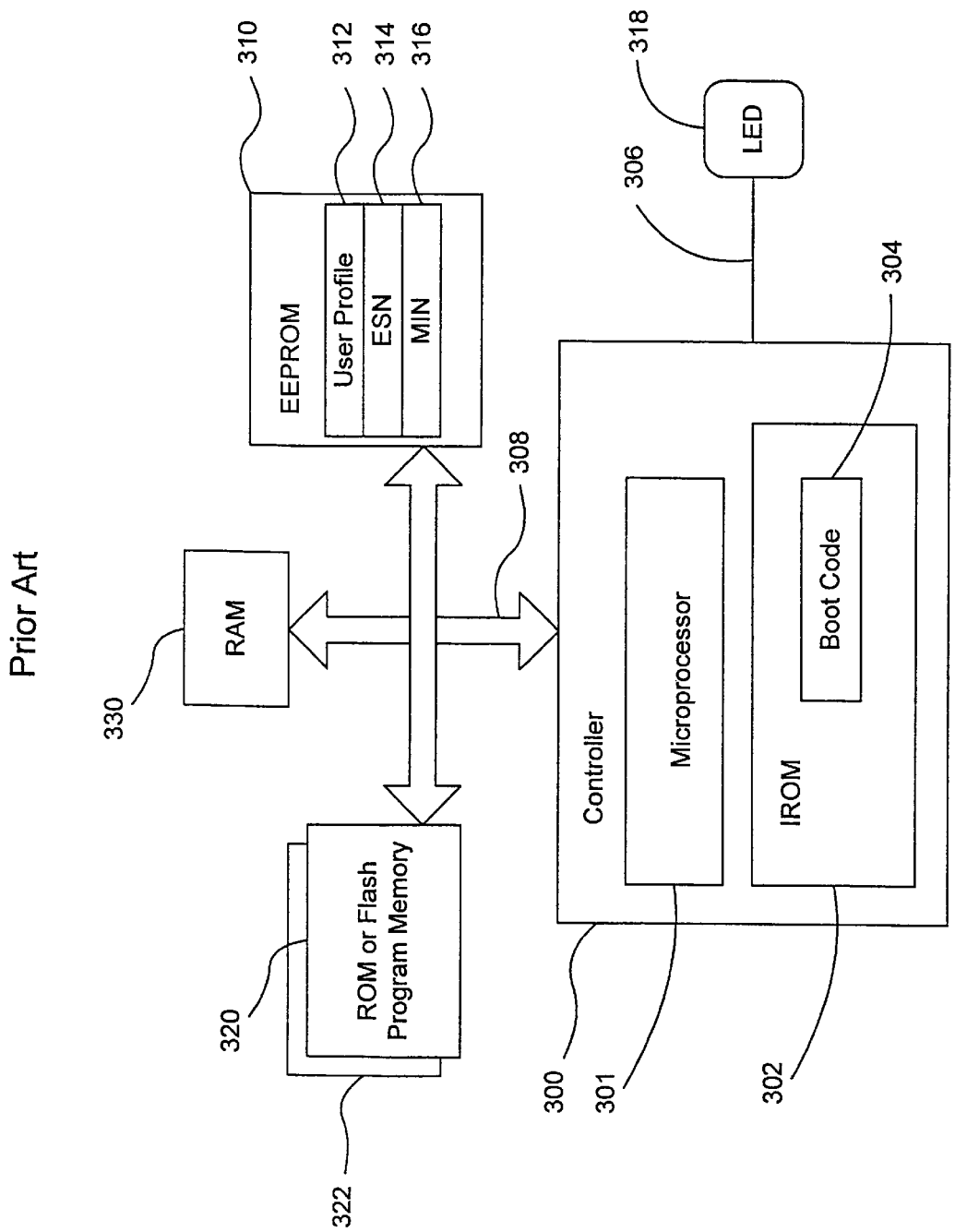
FIG. 3 depicts a conventional cellular telephone processor and memory arrangement.
Figure 4:
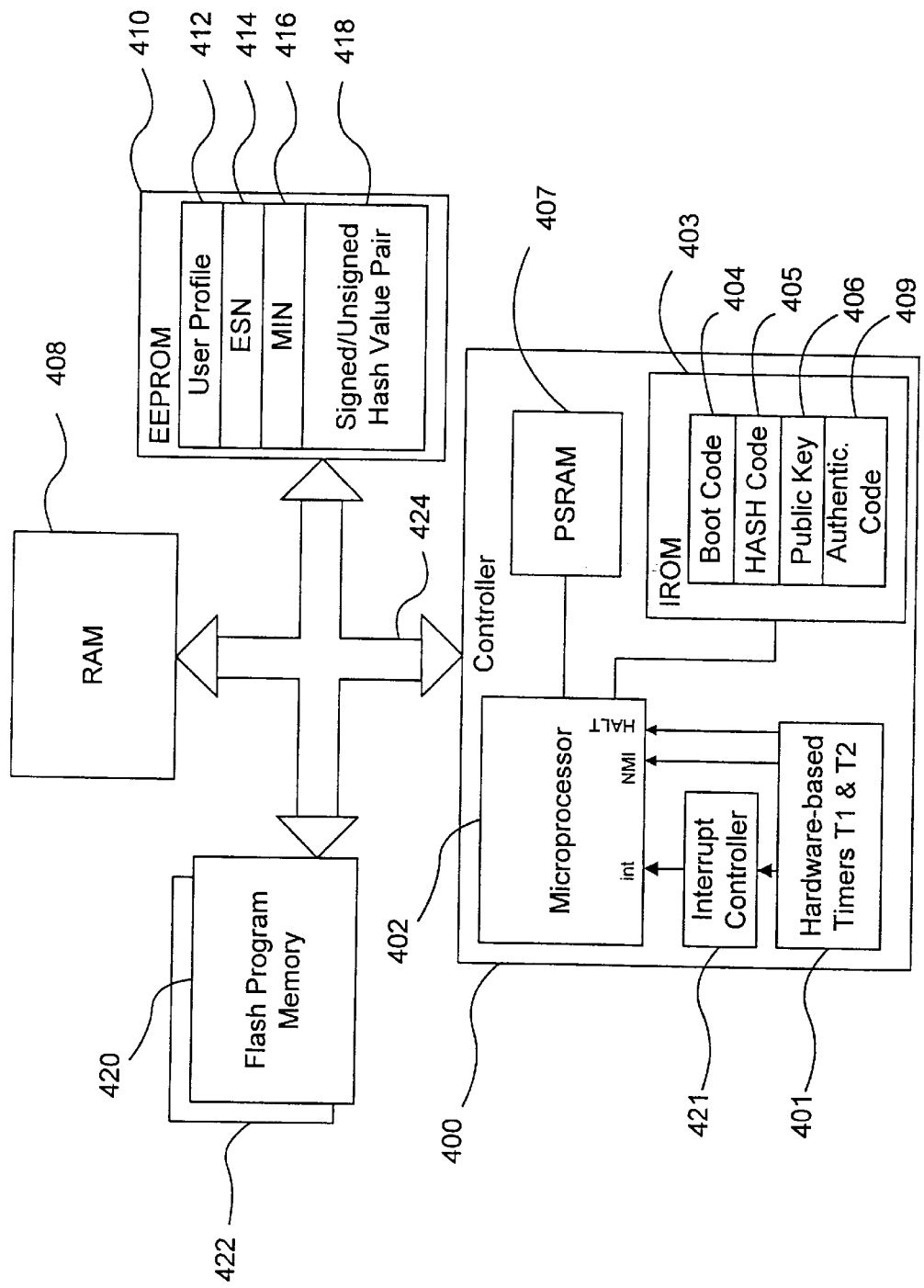
FIG. 4 depicts a cellular telephone processor and memory arrangement in accordance with an exemplary embodiment of the invention.
Figure 12:
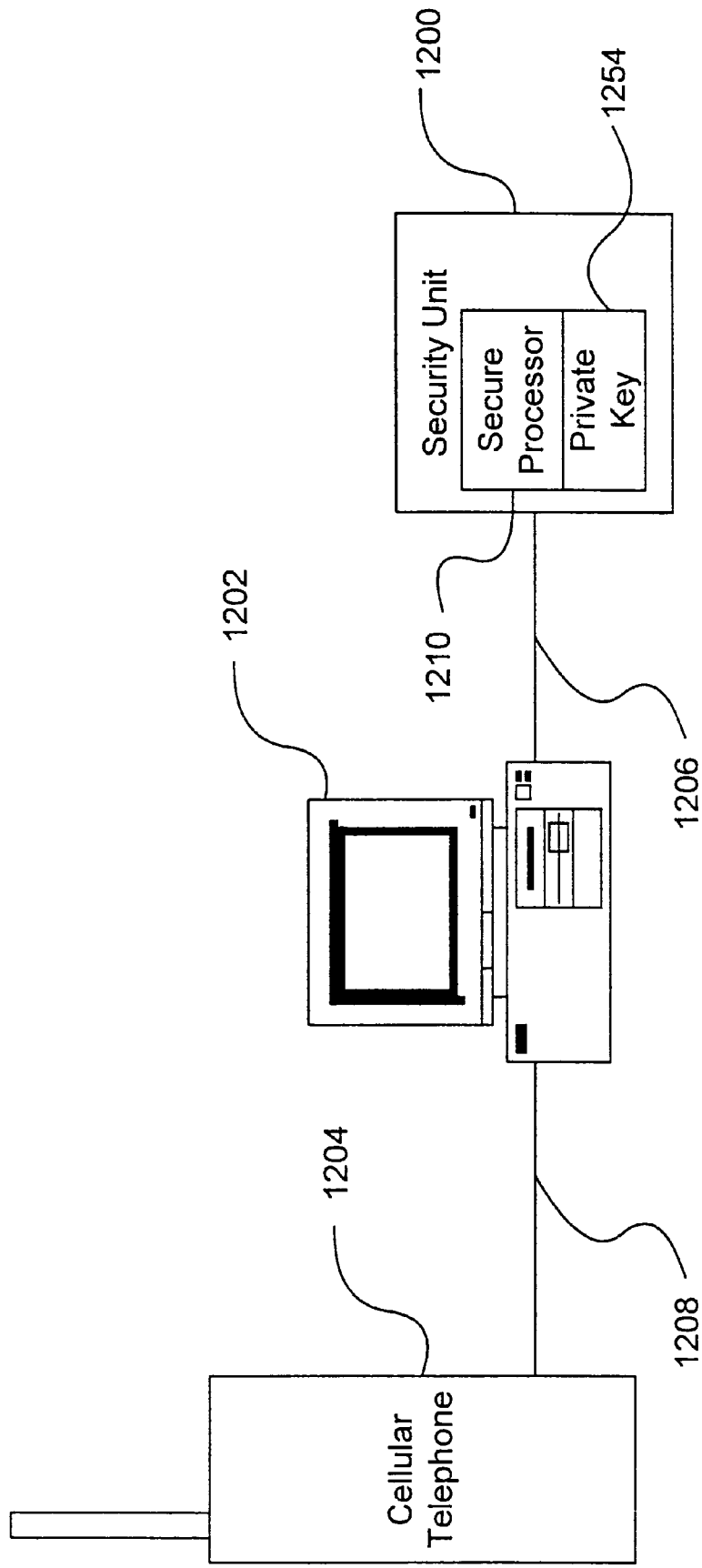
FIG. 12 depicts an exemplary cellular telephone programmer in accordance with an embodiment of the invention.

Referring to FIG. 4, a controller 400 controls operation of a cellular telephone (see, e.g., reference 1204 in FIG. 12). The controller 400 operates in conjunction with a flash program memory 420, ail electronically erasable programmable read only memory (EEPROM) 410, and a random access memory (RAM) 408. The controller 400 includes a microprocessor 402 and an internal read-only memory (IROM) 403. The IROM 403 contains boot code 404, hashing code 405, authentication code 409, and a public encryption key 406. The controller 400 also contains a protected static random access memory (PSRAM) 407, an interrupt controller 421, and hardware-based timers 401 for initiating periodic hash calculations by the microprocessor 402 on selected memory contents. The EEPROM 410 includes user profile data 412, an ESN 414, a MIN 416, and a signed/unsigned valid hash value pair 418. Instruction code involved with the general operation of the cellular telephone is contained in the flash program memory 420. The RAM memory 408 is used as a scratchpad for operations which are part of the normal cellular telephone call processing. Operations involving sensitive data, hash value calculations and authentication processes are preferably carried out in conjunction with the PSRAM 407. The controller 400 communicates with the flash program memory 420, the RAM 408 and the EEPRC)M 410 via memory bus 424.

Figure 5:
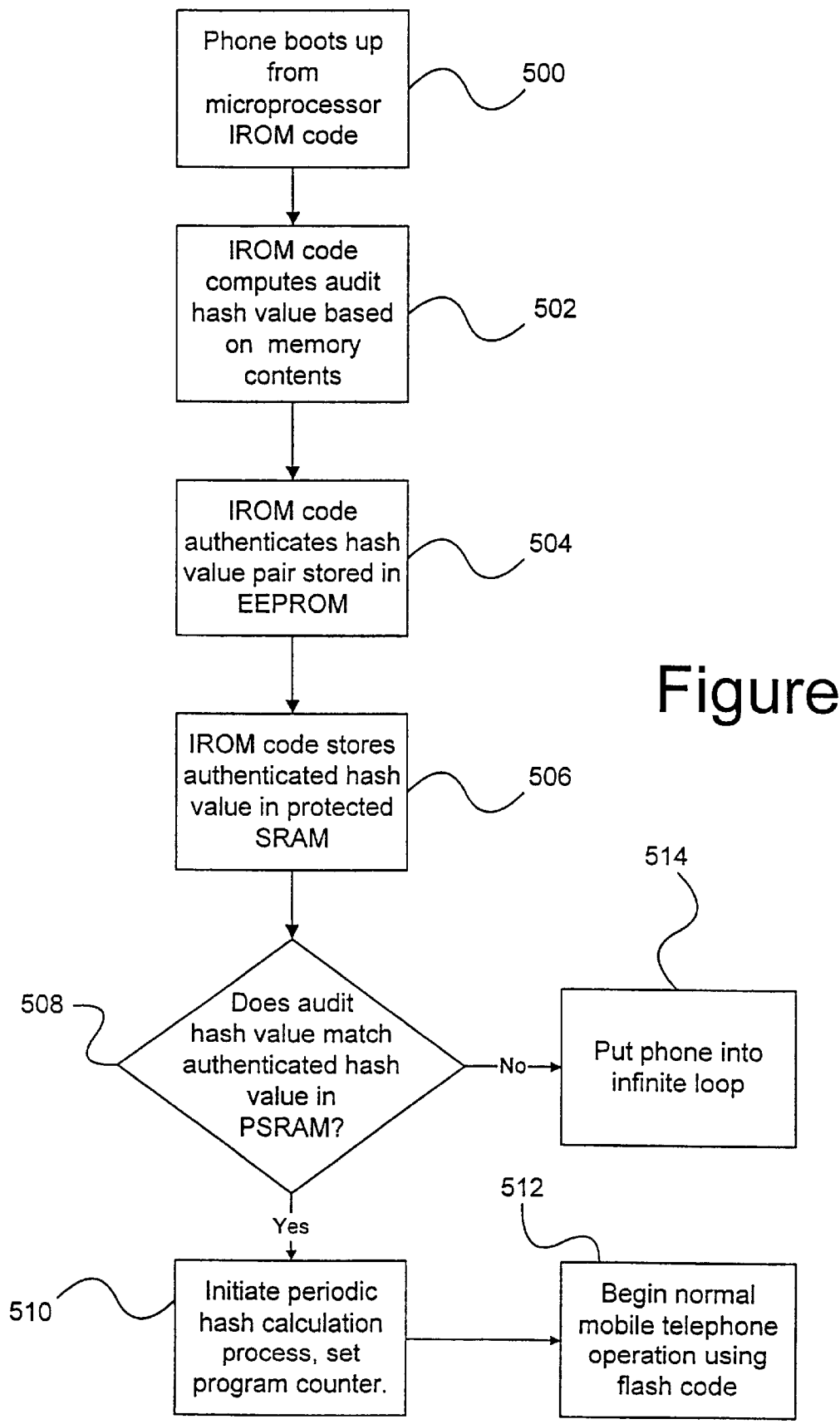
FIG. 5 depicts a flow diagram illustrating an exemplary cellular telephone start up process in accordance with an embodiment of the invention.

A process for telephone power-up and memory validation for the system depicted in FIG. 4, according to an exemplary embodiment of the invention, is illustrated in FIG. 5. After the cellular telephone is turned on, boot code 404 within the IROM 403 is executed by the microprocessor 402 to initialize the controller (block 500). Hash code 405 contained in the IROM 403 is then run to perform an audit hash value calculation over selected contents of the flash program memory 420 and the ESN value 414 stored in EEPROM 410 (block 502). The controller then authenticates the signed valid hash value pair 418 stored in the EEPROM 410 (block 504). This may involve authenticating the signed valid hash value by processing it with a public key 406 and then comparing the result with the unsigned hash value. The authenticated hash value is then stored in PSRAM 407 (block 506). The audit hash valve derived at block 502 is then compared with the authenticated hash valve derived at block 504 (block 508). If the two hash values match, a microprocessor program counter is set to an appropriate location in the flash memory 420, and a periodic hash value calculation process is enabled (block 510), whereafter the cellular telephone begins normal operation (block 512). If the hash values do not match at block 508, the system is put into an infinite loop (block 514), or is otherwise disabled. The forgoing process prevents a cloner from substituting either a modified program in flash memory or a modified ESN in EEPROM 410, as doing so would cause a hash value mismatch, thereby rendering the telephone inoperable.

To prevent a shadow memory 422 from being substituted for the valid flash memory 420 following initiation of normal operation, it is preferable to perform periodic hash value processing. During normal telephone operation the periodic hash valve calculation can take place in response to the expiration of a timer, or in response to other system events. In the exemplary embodiment depicted in FIG. 4, a periodic hash calculation is initiated in response to expiration of a hardware-based timer 401 which causes a non-maskable interrupt (NMI) to be generated. An NMI is a hardware-oriented interrupt that cannot be "masked" out by software processes. Consequently, a cloner cannot configure shadow code that is designed to disregard an NMI. A regular interrupt is also a hardware interrupt that must compete with other regular interrupts from normal cellular telephone events to gain access to microprocessor resources. A regular interrupt is acknowledged and processed when it becomes the highest priority interrupt requesting service.

Since a complete hash value calculation may take longer than can be tolerated by normal telephone operation, it is preferable to provide a capability for performing the process on a piecemeal basis in several segments spread over a period of time (e.g., a few seconds). In accordance with another aspect of a preferred embodiment, hardware-based timers invoke a two step process to perform a segment of the hash value calculation. First, a non-maskable interrupt (NMI) causes the microprocessor to immediately retrieve the contents of a next flash or EEPROM memory location scheduled for inclusion in the periodic hash calculation and store it in PSRAM. The NMI is preferably a short, top priority variety of interrupt that causes negligible effect on the microprocessor tasks that may be active when the NMI occurs. This assures that no actions can be taken by clone software to avoid detection by the hash calculation. A second, lower priority standard interrupt, also is generated by the hardware-based timers 401 which requests service to complete the current segment of the hash value calculation based on the memory byte previously captured by the NMI routine. This task may be deferred, as required for normal call processing tasks, for a predefined maximum time (T) before the hardware timer expires and disables the telephone. The maximum time (T) is chosen to be adequate for any legitimate call processing to be completed, the hash calculation segment to be finished, and the hardware timer to be reset to the beginning of its countdown cycle before it expires. The strategy of using two types of interrupts to periodically complete a segment of the hash value calculation avoids any degradation in system response while assuring the security check cannot be bypassed by clone software residing in shadow flash memory.

Figure 6:
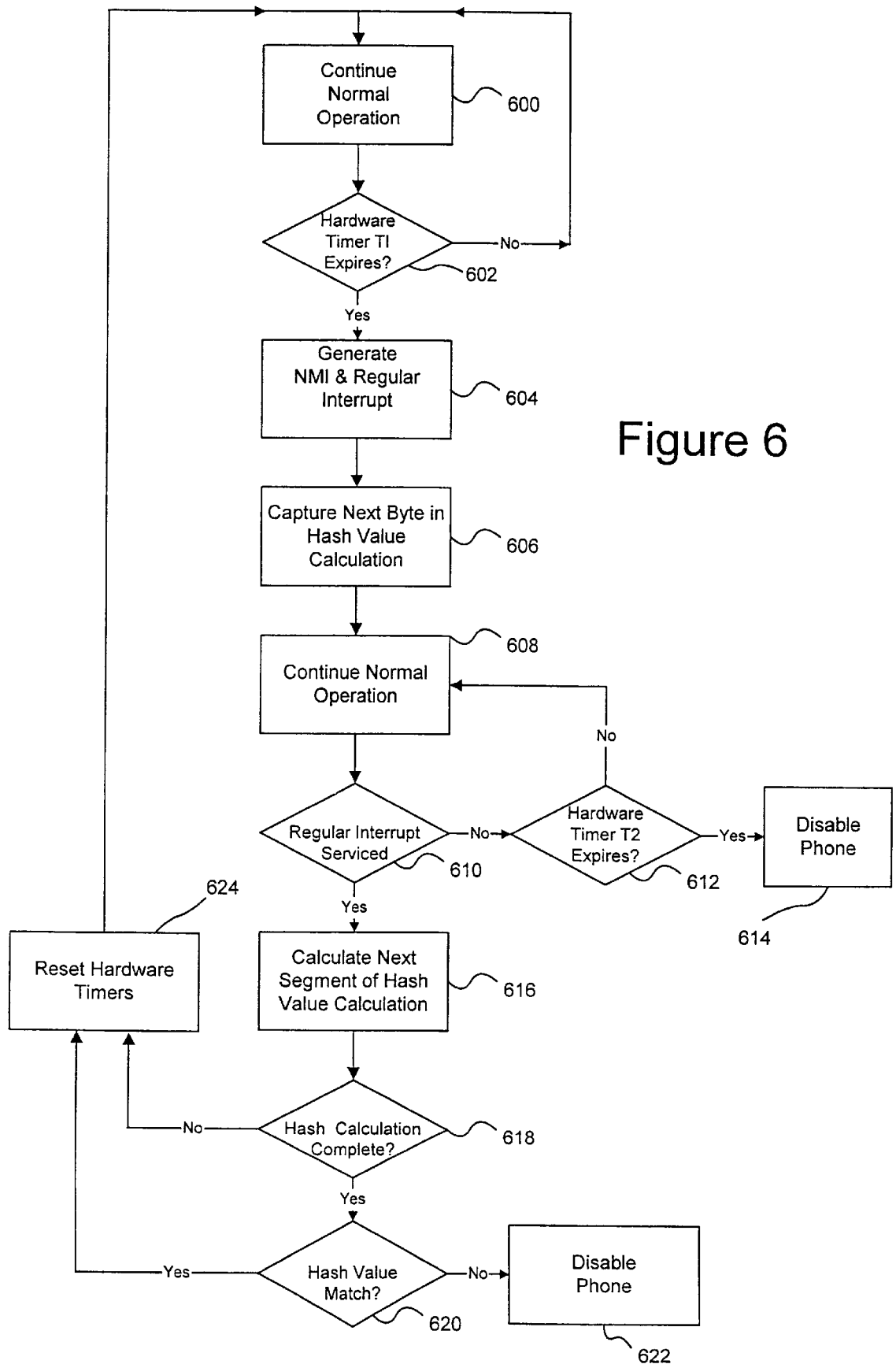
FIG. 6 depicts a flow diagram illustrating an exemplary periodic memory validation process in accordance with the invention.

A flow diagram depicting an exemplary periodic hash value calculation process in accordance with the invention is illustrated in FIG. 6. Referring to the figure, both a NMI and a regular interrupt is generated at block 604 when the T1 counter in hardware timer 401 expires (block 602). Once the NMI gains control of the microprocessor (block 604), the system disables or queues regular interrupts for a brief period of time during which the next byte in flash or EEPROM memory required for the hash calculation is copied to PSRAM (block 606). Control is then returned to the task executing when the NMI occurred (block 608). Under normal conditions, within a short period of time, the normal interrupt from the hardware-based timer 401 also is serviced (block 610) and a segment of the hash calculation is completed based on the memory byte previously stored in PSRAM (block 616). If the hash value calculation is not yet complete, the hardware-based timers (T1 & T2) 401 are reset to their initial values (block 624) and normal telephone operation continues (block 600) until the next expiration of timer T1. If the timer T2 should expire (block 612) before the regular interrupt is serviced (block 610) the telephone is disabled (block 614). The default expiration of timer T2 (unless the regular interrupt is correctly serviced) prevents a cloner from disabling the periodic hash calculation.

This periodic piecemeal calculation of the hash value continues until the audit hash value calculation is completed (block 618). The previously authenticated hash value is then fetched from PSRAM and compared to the audit hash value (block 620). If there is a match, the hardware-based timers 401 are reset (block 624) and the telephone continues to operate normally (block 600). If there is a mismatch, the system is disabled (block 622), e.g., by placing the microprocessor 402 into a halt condition.

The selected contents of the cellular telephone memory over which the hash calculation is performed preferably include contents from the flash memory 420 and the ESN within the EEPROM 414. This prevents a cloner from physically removing or modifying either the flash memory or EEPROM and replacing them with a reprogrammed device containing a modified ESN and/or program code designed to defraud the cellular carrier. It is preferable that the memory contents selected, and the hash value calculation used, render the telephone inoperable from modification of even one bit of memory included in the hash value calculation.

Figure 7:
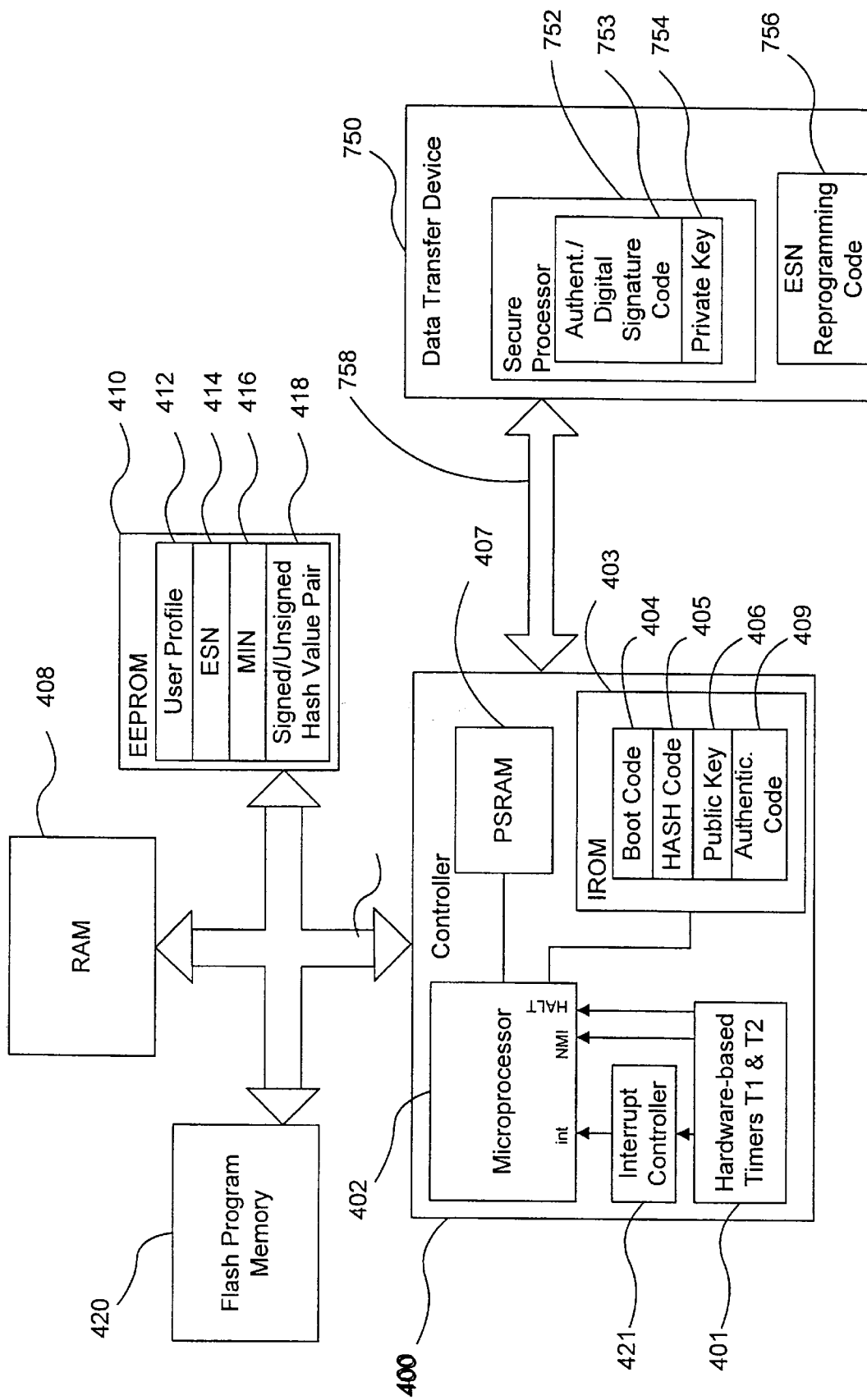
FIG. 7 depicts an exemplary data transfer device in accordance with an embodiment of the invention.

In accordance with another aspect of the invention, a cellular telephone can be programmed in a secure manner using a data transfer device. An exemplary data transfer device in accordance with the invention is shown in FIG. 7. The reference numbers of the controller 400, its contents, and related memories are identical to the figure references of FIG. 4. The exemplary data transfer device 750 includes a secure microprocessor 752, which contains a private encryption key 754 that corresponds to a public encryption key 406 in the IROM 403 in the controller 400. The secure microprocessor 752 communicates with the cellular telephone controller 400 via an interface 758. The interface 758 can be a wired serial connection, such as an RS-232 link, a wireless infrared interface, or an RF interface, such as the main antenna of a cellular telephone (not shown), or another antenna within the cellular telephone.

Figure 8:
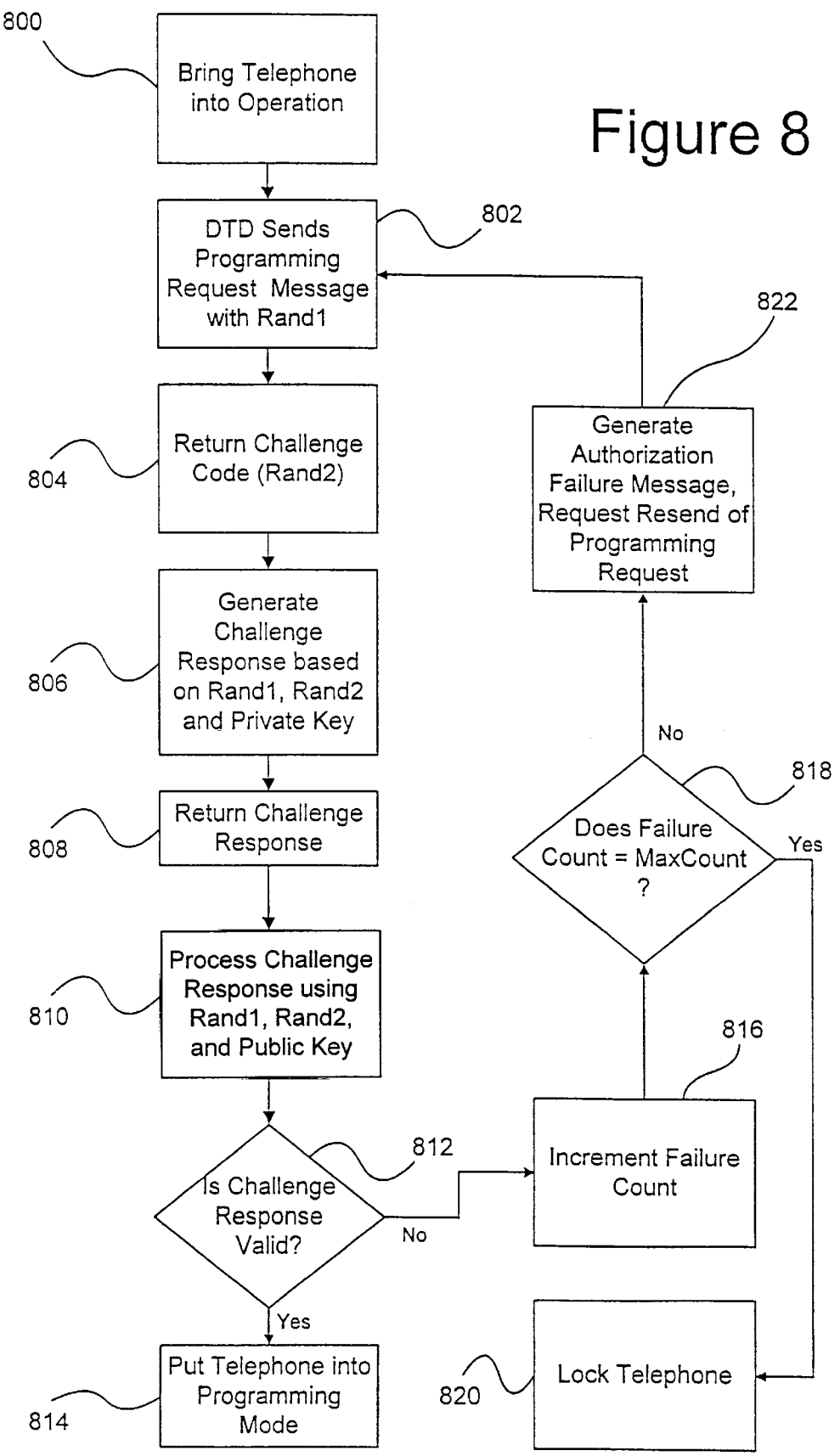
FIG. 8 depicts a flow diagram illustrating an exemplary process for authenticating the data transfer device in accordance with an embodiment of the invention.

Access to cellular telephone memory by the data transfer device 750 is permitted only after a rigorous authentication process is completed. More specifically, the controller 400 (and related memory components) can be accessed for the purpose of downloading data only after the data transfer device 750 undergoes a challenge-response process to ensure its authenticity. FIG. 8 illustrates an exemplary process for authenticating the data transfer device 750 in accordance with and exemplary embodiment of the invention. As a first step (block 800), the telephone is brought into an operating condition preferably using the fraud prevention process previously described with respect to FIG. 5. After an interface is established, the secure processor 752 sends a programming request message to the controller 400 along with a random number (Rand1) generated by the secure microprocessor 752 (block 802). In response, the controller 400 sends a random number challenge code (Rand2) to the secure microprocessor 752 (block 804). The secure microprocessor 752 then generates a challenge response based on Rand1, Rand2, and the private key 754 (block 806). The challenge response is then returned to the controller 400 (block 808). The challenge response is processed by the controller 400 using Rand1, Rand2, and the public key 406 (block 810). The processed challenge response is then authenticated by comparing its value with Rand2 (block 812). If the challenge response decrypts properly (e.g., Rand2), the authenticity of the data tralnsfer device is verified and the telephone enters into a programming mode (block 814). Thereafter the data transfer device 750 can access the various memories in the cellular telephone and/or download new flash memory 420 contents.

If the challenge response is not valid, a failure count is incremented (block 816). The failure count is checked to see if a predetermined number (maxcount) has been reached (block 818). The failure count takes into consideration that the data transfer device 750 may be communicating with the controller 400 over a noisy medium. Any resulting transmission errors may result in authentication failure. Hence, it is preferable to provide the data transfer device 750 with more than one chance to put the cellular telephone into a programming mode. In an exemplary embodiment of the invention, a maxcount of fifty was determined to be suitable. If the predetermined number has not been reached, a message is sent to the data transfer device 750 indicating that an authentication failure has occurred (block 822). Upon receiving such an indication, the authentication process is restarted at block 802. If the predetermined number of attempts has been reached, the telephone is put into an inoperable condition and a message can be displayed indicating to a user that the telephone must be returned for authorized service.

After the data transfer device 750 has completed any ESN reprogramming or downloading to the flash memory 420, the controller 400 within the telephone initiates a new hash calculation that includes, for example, the revised contents of flash memory 420 and the ESN 414. The resulting hash value is sent to the data transfer device 750 for a digital signature using the private key 754. The signed hash value is then returned to the controller 400 for storage in the EEPROM 410, along with an unsigned version of the same hash value.

Figure 9:
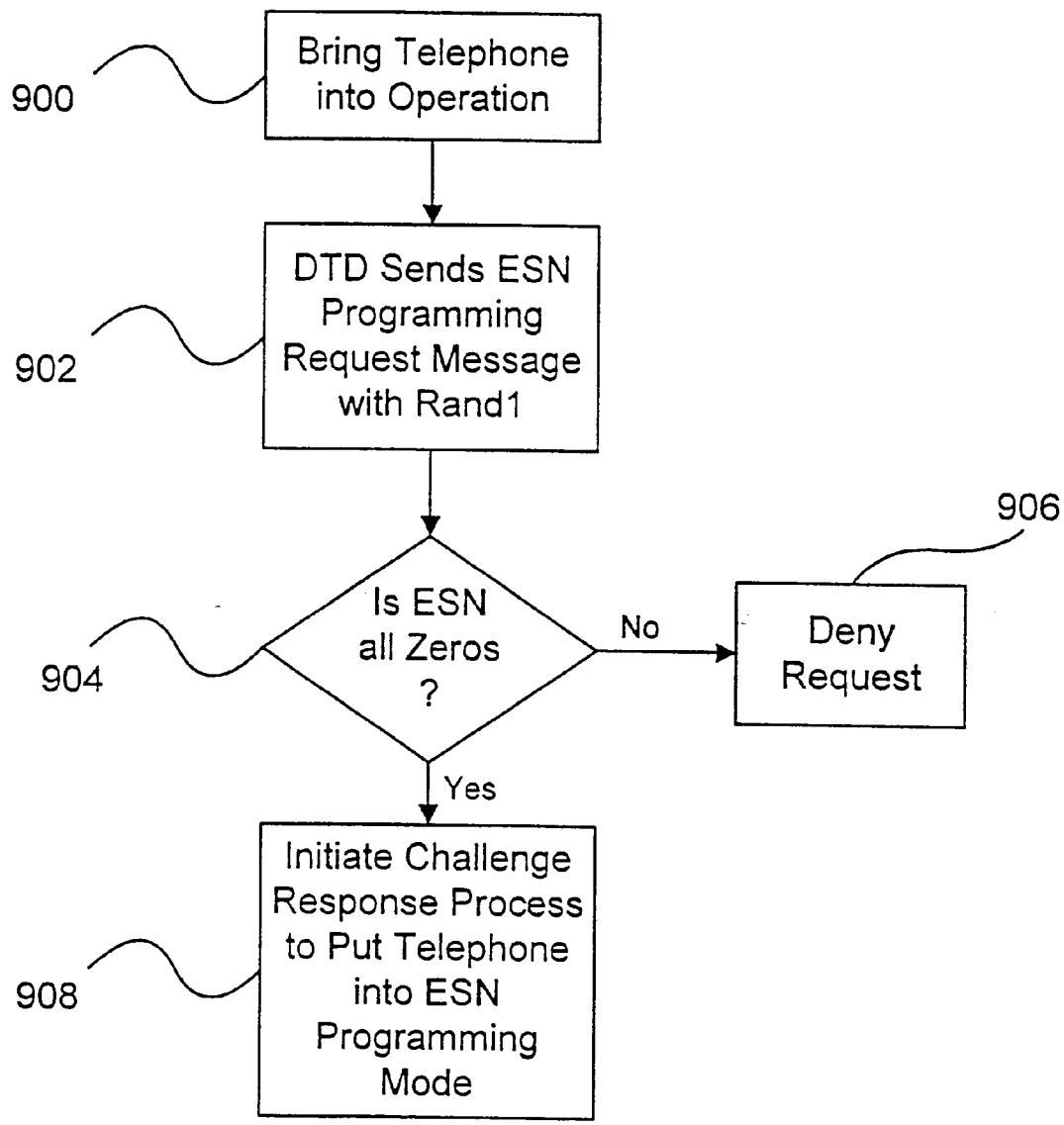
FIG. 9 depicts a flow diagram illustrating an exemplary process for entering an initial ESN into a cellular memory in accordance with an embodiment of the invention.

The ESN can be reprogrammed in accordance with the invention, but for security reasons, ESN programming is preferably done at the factory level, rather than by authorized factory representatives. Programming of an ESN can occur in two situations: initial ESN programming during manufacturing, and reprogramming an existing ESN. An initial ESN can be programmed using a data transfer device similar to that of FIG. 7. The initial ESN programming, process is described below with respect to FIG. 9.

As a first step (block 900), the telephone is brought into an operating condition (see FIG. 5). Following establishment of an interface with the telephone, the secure processor 752 sends an ESN programming request message to the controller 400 along with a random number (Rand1) (block 902). The controller 400 performs a check to determine whether the ESN within the telephone is all zeros which is always the case for a newly manufactured telephone (block 904). If the ESN is not all zeros, the ESN programming mode request is denied (block 906). If the ESN is all zeros, a challenge-response process substantially similar to that set out in steps 804 through 820 of FIG. 8 is initiated (see block 908). Following successful authentication of the data transfer device 750, a new ESN can be downloaded into the EEPROM 410.

After the data transfer device 750 has completed downloading the ESN into the EEPROM 410, the controller 400 initiates a new hash calculation that includes the new ESN 414. The resulting hash value is sent to the data transfer device 750 for a digital signature using the private key 754. The signed hash value 418 is then returned to the controller 400 for storage in the BEPROM 410, along with an unsigned version of the same hash value.

Figure 10:
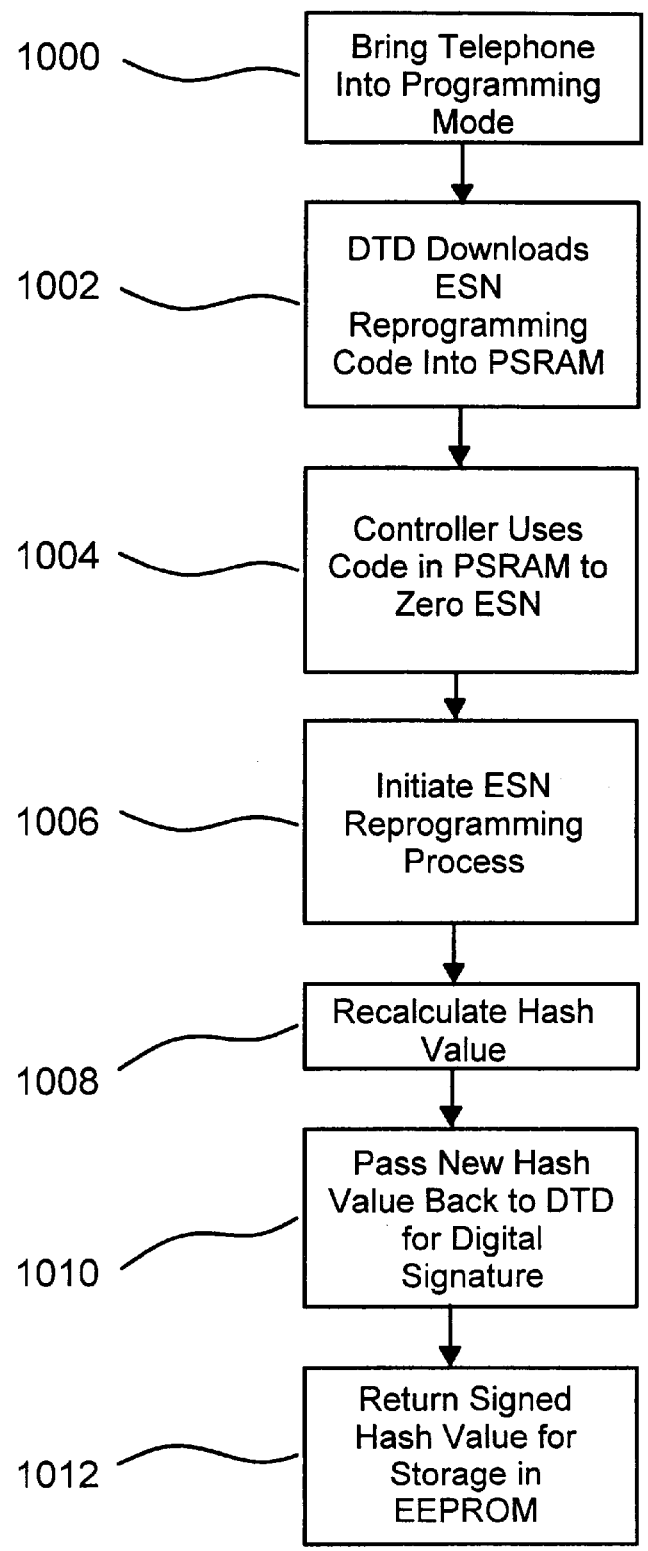
FIG. 10 depicts a flow diagram illustrating an exemplary process for reprogramming an established ESN in accordance with the invention.

An existing ESN also can be reprogrammed in a system incorporating the present invention. The ESN reprogramming process is preferably done only at the factory and not by local authorized factory representatives. Added security is provided by utilizing a set of microprocessor instructions, available only at the factory, that are loaded into a telephone for the purpose of changing an ESN previously programmed into the telephone. The process can be carried oul using a data transfer device similar that shown in FIG. 7 and is described below with respect to FIG. 10.

As a first step (block 1000), the telephone is put into a regular programming mode in accordance with the process illustrated in FIG. 8. A factory data transfer device 750 contains ESN reprogramming code 756 that can be downloaded into the PSRAM memory 407 of the cellular telephone to facilitate ESN reprogramming. Having put the system into programming mode, the ESN reprogramming code 756 is downloaded into the PSRAM 407 (block 1002). In executing the ESN reprogramming code 756, the controller 400 zeroes the existing ESN (block 1004) and initiates the ESN reprogramming process (block 1006).

After the data transfer device 750 has completed entry of the new ESN into the EEPROM 410, the controller 400 initiates a new hash calculation that includes the new ESN 414 (block 1008). The resulting hash value is sent to the data transfer device 750 for a digital signature using the private key 754 (block 1010). The signed hash value 418 is then returned to the controller 400 for storage in the EEPROM 410 along with an unsigned version of the same hash value (block 1012).

Hash value calculation and digital signature in exemplary embodiments of the present invention are carried out using one-way hashing functions and a private/public key authentication scheme. A one-way hash function is used to derive the hash value representative of memory contents within the cellular telephone. The public/private key system is used to provide security for the valid hash value stored in EEPROM and authenticate a data transfer device or programmer attempting to manipulate memory in the cellular telephone. One-mway hashing is known to those skilled in the art, and is described, for example, in U.S. Pat. No. 5,343,527 to Moore.

A one-way hash function is a function that is simple to compute in a forward direction, but difficult to compute in a reverse direction. A one-way hash function, H(M), operates on an arbitrary-length input, M, which in exemplary embodiments of the present invention is comprised of selected electronic memory contents. The hash function performed on M returns a fixed-length hash value, h (see Equation 1).

$$h = H(M) \qquad \text{Equation 1}$$

There are many functions that can take an arbitrary-length input and return an output of fixed length, but one-way hash functions have the following additional characteristics: given M, it is easy to compute h; given h, it is hard to compute M; and given M, it is hard to find another message, M', such that H(M)=H(M').

The basic attack against a one-way hash is: given the hash value of the memory input (hashed contents), a cloner would seek to create another set of memory contents, M', such that H(M)=H(M'). If the cloner were successful in doing this, it would undermine the security of the one-way hash function. The aim of the one-way hash is to provide a unique signature, or fingerprint of M. In the present invention, a secure one-way hash function is performed on selected contents of a cellular telephone memory to produce an audit hash value. The audit hash value is compared to a valid hash value previously produced by performing the one-way hash function on the selected memory contents from memory that is known to be authentic.

In a preferred embodiment, a message digest algorithm, such as MD5, is used for the secure one-way hash calculation. The MD5 algorithm produces an N-bit hash, or message digest, of the input message (i.e., the selected memory contents). The MD5 algorithm is very sensitive in that a change in a single bit in the selected contents statistically results in half of the hash value bits changing. The MD5 algorithm also is known for its speed and simplicity. Speed is an important consideration in that the time demands placed on the cellular telephone's microprocessor cannot be so great so as to unacceptably interfere with ordinary system processes.

The MD5 algorithm also is suitable because it can be performed on an incremental basis thereby allowing interruption of the hash process so that a regular microprocessor task can be addressed before hashing is resumed. In addition, the MD5 algorithm is well suited for use in conventional microprocessor architectures. Other one-way hash algorithms that can be used in accordance with embodiments of the present invention include, but are not limited to: Snerfu, H-Hash, MD2, MD4, Secure Hash Algorithm (SHA), and HAVAL. One skilled in the art will readily be able to program a microprocessor to carry out the one-way hash process.

Public key algorithms use two keys, one publicly available and one privately held (secret) for tasks such encrypting and decrypting messages, message authentication, and digital signatures. The keys can be utilized in different ways to achieve different goals. For example, if the aim is to keep a message secret, the private key should be kept secure by a recipient so only the recipient can decrypt messages. In such a case, the encryption key can be publicly known and known to be associated with a particular potential recipient. Although the sender can be assured of information secrecy in this process, the recipient cannot be assured of sender authenticity. If the private (secret) key of a pair of keys is maintained in secrecy by a sender for encryption, any recipient with a corresponding public key can be assured of the sender's authenticity, albeit without an assurance of secrecy. It is the latter scheme that is utilized to authenticate a data transfer device in accordance with the present invention.

Public key algorithms operate based on mathematical trapdoor functions which make it computationally unfeasible to deduce the private key from the public key. In the case of the well known RSA (Rivest, Shamir, and Adleman) algorithm, security depends on the difficulty of factoring the product of two large prime numbers. Key selection begins with the selection of two large prime numbers p and q, which, multiplied together, produce a large number n.

$$n=pq \qquad \text{Equation 2}$$

The encryption key e is then randomly chosen such that e and (p−1)(q−1) are relatively prime. Finally Euclid's algorithm is used to compute the decryption key, d such that $$F=(p-1)(q-1) \qquad \text{Equation 3}$$

$$ed=1(\text{mod} F) \qquad \text{Equation 4}$$

The numbers e and n are the public key; the number d is the private key. Equation 5 gives the RSA encryption process, and Equation 6 gives the decryption process.

$$C=M^e(\text{mod } n) \qquad \text{Equation 5}$$

$$M=C^d(\text{mod } n) \qquad \text{Equation 6}$$

An adversary able to factor n could use Equation 3 to determine the modulus, F, and then determine the private key, d, from Equation 4, given the public key e. Nevertheless, as noted above, n is usually so large as to make such factoring impractical. More details on the RSA algorithm can be found in U.S. Pat. No. 4,405,829 to Rivest et al.

In preferred embodiments of the present invention, the Fiat-Shamir (FS) algorithm, or a variant thereof is utilized (reference is made to U.S. Pat. No. 4,748,668 whose contents are incorporated entirely herein by reference). The FS algorithm is adapted to implement an authentication and digital signature scheme which is well suited to the limited computational capabilities of typical cellular telephones.

The FS algorithm is different from previous schemes, such as RSA, in that the FS algorithm uses factors based on the difficulty of finding the inverse of a quadratic residue ($v_i$) modulo n. More specifically, the FS scheme involves selecting a number n that is the product of two large prime numbers that are preferably between 512 and 1064 bits in length. A public key (v): $V_1, v_2, \ldots V_k$, and a private key (s): $S_1, S_2, \ldots S_k$, are generated such that $s_i=\text{sqrt}(1/v_i)\text{mod } n$. The difficulty in finding the inverses $(1/v_i)\text{mod } n$ within the context of the foregoing equation can be shown to be equivalent to the difficulty of finding the factors of the prime number n. Without sacrificing security, the algorithm executes much more quickly than other schemes. In fact, the FS scheme has been found to outperform the RSA scheme in that a FS calculation requires only 1% to 4% of the modular multiplication's normally needed to complete the necessary authentication computations. This corresponds to authentication of the signed hash value at a speed that is up to two orders of magnitude quicker than using a RSA scheme to perform the same task. Consequently, data transfer device authentication and periodic audit hash value comparison can be performed. considerably faster using a FS scheme than using a RSA scheme. When mass programming cellular telephones, or other electronic memories at the factory level, use of the FS algorithm reduces production time by more quickly generating digital signature of valid hash values for storage. Other algorithms that can be applied include, but are not limited to, ELGAMAL, DSA, and Fiege-Fiat-Shamir.

Figure 11:
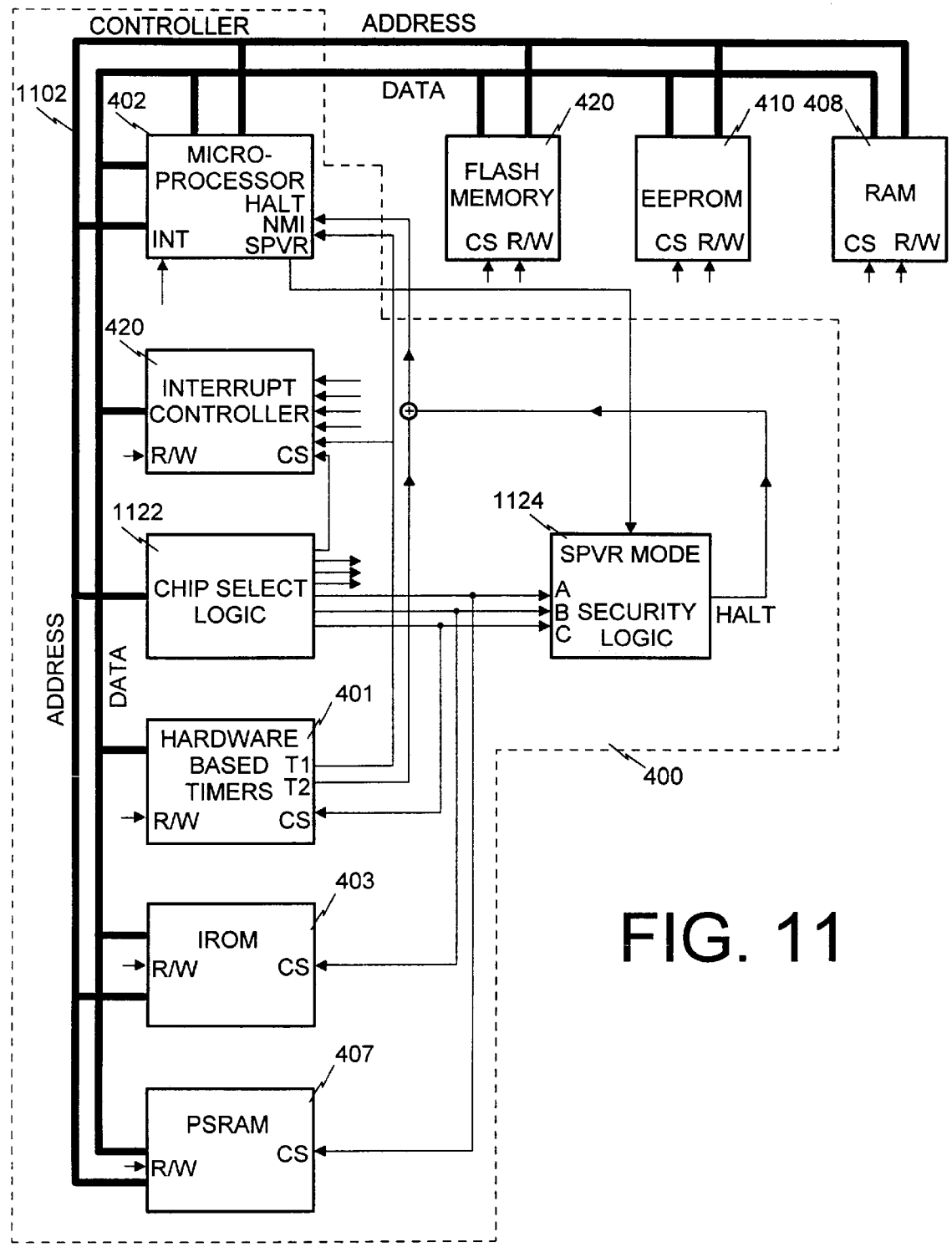
FIG. 11 depicts a protected memory arrangement in accordance with an exemplary embodiment of the invention.

In accordance with another aspect of the invention, controller hardware within a cellular telephone has security features that prevent a cloner from determining the contents of secure memory or otherwise by-passing the security schemes previously described. FIG. 11 depicts controller hardware, external memories, and details of a memory/address bus structure. Except for the chip select logic 1122 and the security logic 1124, the function and operation of elements in the controller are the same as described for FIG. 4. The chip select logic 1122 decodes addresses on the microprocessor address bus 1102 to provide hardware select signals for memory components and hardware devices connected to the bus 1102. For example, any time an address appears on the address bus 102 which is assigned to the IROM memory 403, an IROM chip select (CS) is enabled.

The security logic 1124 functions to detect attempts to access the contents of PSRAM 407 or to reset the hardware-based timers 401 using microprocessor instruction code stored in a memory device other than the IROM memory 403. For example, a read or write instruction located in the flash memory 420 with a target address of a memory location in PSRAM 407 will be detected as an illegal operation. Any illegal access attempt results in the microprocessor being forced into a halt state which requires a complete power reset of the cellular telephone to resume normal operation.

The security logic is an implementation of the following logic equations:

$$S=\uparrow\text{Supvr}\cdot B \qquad \text{Logic Equation 1}$$

$$\text{Halt}=\text{notS}\cdot(A+C) \qquad \text{Logic Equation 2}$$

where:
  S=Security mode;
  ↑Supvr=A transition of the microprocessor into supervisory mode;

A=Chip select signal for the PSRAM memory;

B=Chip select signal for the IROM memory;

C=Chip select signal for the hardware time; and

Halt=A hardware control input to the microprocessor which causes it to enter an endless loop or permanent wait condition until power is removed and reapplied to the telephone.

Logic Equation 1 above states: The security mode (S) is set whenever the microprocessor transitions into supervisory mode (↑Supvr) at the same time that the IROM 403 chip select is active (·B). Logic Equation 2 above states: The microprocessor halt input is activated if the controller 400 is not in security mode (not S) and either the PSRAM 407 or hardware timer chip selects are active (·(A+C)). This logic effectively prevents bypass of the security measures provided by the hash value comparisons and authentication process previously described since legitimate accesses to the PSRAM 407 and reset commands to the hardware timers 401 preferably come from code stored in the IROM 403.

All legitimate code loc(ated in the IROM memory 403 (boot code, hash code, public key code, and authentication code) is preferably bracketed by instructions which cause the security mode to be set at the beginning of a routine and cleared when leaving the routine. In a preferred embodiment of the invention, a software interrupt instruction (commonly available in modern microprocessors) is placed at the beginning of each routine in IROM 403 to switch the microprocessor 402 into a supervisory mode and cause a microprocessor hardware signal SPVR to become active. Since the IROM 403 chip select signal will be active at that time, the security mode S will be set. Executing a return instruction at the end of the software routine cancels the security mode.

In accordance with another aspect of the invention, the data transfer device comprises a factory-supplied security unit that can be used in combination with a general purpose computer. An exemplary arrangement is depicted in FIG. 12. A security unit 1200 is attached to an I/O port of a PC 1202 via a standard connector 1206. A second port on the PC 1202 is used in conjunction with a second standard connector 1208, such as an RS-232, cable or infrared link, to interface with a cellular telephone 1204. The processes illustrated in FIG. 8 can be performed using the arrangement depicted in FIG. 12 to carry out the cellular telephone reprogramming process. An authorized factory service representative having a standard PC and a security unit 1200 is equipped to reprogram telephones.

In accordance with another embodiment of the invention, an existing cellular telephone can be provided with field programming capability that is secure against attacks which do not involve gaining access to the internal printed circuit card assembly. This level of protection is very effective against the most common methods of cloning attacks in which memory contents within the telephone are modified using test commands accessible through an external telephone connector. This can be done by upgrading a current cellular telephone to use the Data Transfer Device (DTD) authentication procedure described in FIG. 8 prior to granting access to the field programming commands. Both the authentication software code and the public key are stored in the existing flash memory thus avoiding any changes to present conventional designs.

Exemplary applications of the invention have been described in the context of one-way hashing and key encryption systems as applied in securing and programming an electronic memory in a cellular telephone. However, those skilled in the art will readily appreciate and recognize that any appropriate function, calculation, algorithm, method or system for deriving a signature of memory contents can be applied in accordance with the invention. Furthermore, the invention has been described with reference to particular embodiments. However, it will be readily apparent to those skilled in the art that it is possible to embody the invention in specific forms other than those of the preferred embodiments described above. For example, it is possible to embody the invention in any electronic memory and/or electronic memory programming or accessing device without departing from the spirit of the invention. In addition the invention can be applied and carried out in digital signal processors, application specific processors, or any other like processor, or electronic memory-oriented systems. Therefore, the preferred embodiments described herein are merely illustrative and should not be considered restrictive in any way. The scope of the invention is given by the appended claims, rather than by the preceding description, and all variations and equivalents which fall within the range of the claims are intended to be embraced therein.

What is claimed is:

1. A cellular telephone comprising:

a microprocessor; and a memory;

wherein the microprocessor performs a hash calculation on contents of the memory to derive an audit hash value, which audit hash value is compared to a valid hash value previously derived from perlormance of the hash calculation on authentic memory contents, said hash calculation and comparison being secure from tampering.

2. The cellular telephone claimed in claim 1, wherein the audit hash value is periodically derived and compared to the valid hash value.

3. The cellular telephone claimed in claim 2, wherein the periodic derivation of the hash value is performed pursuant to expiration of a hardware-based timer.

4. The cellular telephone claimed in claim 1, wherein said memory includes a flash memory and an EEPROM.

5. The cellular telephone claimed in claim 4, wherein the audit hash value derived based on selected contents of the flash memory and the EEPROM.

6. The cellular telephone claimed in claim 5, wherein the selected contents include an electronic serial number.

7. The cellular telephone claimed in claim 5, wherein the selected contents include microprocessor program code.

8. The cellular telephone claimed in claim 1, further comprising:

a protected random access memory;

wherein the hash calculation is performed in conjunction with the protected random access memory.

9. The cellular telephone claimed in claim 8, further comprising security logic, wherein the security logic supervises access to the protected random access memory.

10. The cellular telephone claimed in claim 1, wherein the valid hash value is authenticated using a public key stored within the memory.

11. The cellular telephone claimed in claim 1, wherein the valid hash value is given a digital signature using a private key.

12. The cellular telephone claimed in claim 10, wherein a public/private key system is used that is selected from the group of algorithms consisting of: ELGAMAL, RSA, DSA, Fiege-Fiat-Shamir, and Fiat-Shamir.

13. The cellular telephone claimed in claim 1, wherein the hash calculation performed is selected from the group of hash functions consisting of: Snerfu, H-Hash, MD2, MD4, MD5, Secure Hash Algorithm (SHA), and HAVAL.

14. In a cellular telephone, a method for detecting memory tampering, the method comprising the steps of:

storing a signed valid hash value produced by performing a hash calculation on selected contents of a memory which memory selected contents are known to be authentic;

producing an audit hash value by performing the hash calculation on the selected contents of the memory; and comparing the audit hash value to the valid hash value, whereby a difference between the audit and the valid hash values indicates alteration of the selected memory contents, wherein the steps of storing, producing, and comparing are secure from tampering.

15. The method claimed in claim 14, wherein the step of producing the audit hash value is performed in conjunction with a protected random access memory.

16. The method claimed in claim 14, further including the step of:

signing the valid hash value with a digital signature based on a private key.

17. The method claimed in claim 14, wherein the steps of producing the audit hash value and of comparing The audit and valid hash values are performed periodically.

18. The method claimed in claim 14, wherein the step of producing the audit hash value is performed pursuant to the expiration of a hardware-based timer.

19. The method claimed in claim 14, wherein the step of producing the audit hash value involves calculating audit hash value segments.

20. The method claimed in claim 19, wherein calculation of an audit hash value segment can be delayed as necessary while other processes occurring within the cellular telephone are completed.

21. The method claimed in claim 14, wherein the valid hash value is given a digital signature, and wherein the step of comparing the audit hash value to the valid hash value includes the step of authenticating the valid hash value against the signature.

22. In a cellular telephone, an apparatus comprising:

a microprocessor;

a flash memory whose contents include operating instructions for the cellular telephone; and an electronically erasable programmable read-only memory (EEPROM) whose contents include a valid hash value derived by performing a one-way hash calculation over selected portions of authentic flash and EEPROM memory contents;

wherein the microprocessor periodically generates an audit hash value by performing the hash calculation over the selected portions, which audit hash value is compared to the authenticated valid hash value to assess whether at least one of the flash and the EEPROM memories have been altered.

23. The apparatus claimed in claim 22, wherein the one-way hash calculation is selected from the group consisting of: Snerfu, H-Hash, MD2, MD4, MD5, Secure Hash Algorithm (SHA), and HAVAL.

24. The apparatus claimed in claim 22, wherein the valid hash value receives a digital signature by a private key prior to being stored, and is authenticated by a public key for the purpose of comparison with the audit hash value.

25. The apparatus claimed in claim 24, wherein a public/private key system used is selected from the group of algorithms consisting of: ELGAMAL, RSA, DSA, Fiege-Fiat-Shamir, and Fiat-Shamir.

26. The apparatus claimed in claim 24, wherein the valid hash value receives a digital signature by the private key using processing means external to the cellular telephone.

27. A system for preventing unauthorized access to a cellular telephone memory programming capability, the system comprising:

a cellular telephone, including
a memory for storing data, and
a microprocessor having a means for authentication; and a data transfer device including signature means for supplying a signed message to the cellular mobile telephone;

wherein the cellular telephone microprocessor assesses the authenticity of the data transfer device based upon an analysis of a signed message supplied by the data transfer device via a first port and a second port of a general purpose computer, wherein the data transfer device is attachable to the first port, and the second port is used to interface with the cellular telephone.

28. A method for assessing the authenticity of a cellular telephone programming device, the method comprising the steps of:

sending a challenge message in response to a programming request via a first port and a second port of a general purpose computer, wherein the cellular telephone programming device is attachable to the first port, and the second port is used to interface with the cellular telephone;

signing the challenge message in the cellular telephone programming device;

sending the signed challenge message to the cellular telephone;

authenticating the challenge message within the cellular telephone; and rejecting the cellular telephone programming device if the challenge message is not received by the authentication step.

29. In a system comprising a data transfer device for programming a cellular telephone, a method for preventing unauthorized access to memory in the cellular telephone, said method comprising the steps of:

sending a programming request from the data transfer device to the cellular telephone via a first port and a second port of a general purpose computer, wherein the data transfer device is attachable to the first port, and the second port is used to interface with the cellular telephone;

sending a challenge message from the cellular telephone to the data transfer device in response to the programming request;

signing a challengeresponse message within the data transfer device;

sending the signed challenge response message to the cellular telephone;

authenticating the challenge response message within the cellular telephone; and entering a programming miode if authentication of the signal challenge response message confirms authenticity of the data transfer device.

30. A system for programming a cellular telephone, the system comprising:

a programmer;

a general purpose computer having a first and a second port;

wherein the programmer is attachable to the first port, and the second port is used to interface with a cellular telephone to be programmed, wherein in response to a request to program the cellular telephone received from the programmer, the cellular telephone returns a challenge which challenge is signed by the programmer and returned to the cellular telephone for authentication, whereby recovery of the challenge through authentication of the signed challenge is indicative of programmer authenticity and causes the cellular telephone to enter into a programming mode.

31. The system of claim 30, wherein the cellular telephone comprises:

a microprocessor, wherein in response to the request to program the cellular telephone received from the programmer, the microprocessor in the cellular telephone issues the challenge to the programmer.

32. In a cellular telephone, a system for preventing fraudulent memory access, comprising:

security logic;

a read only memory containing instruction code;

protected random access memory;

wherein the security logic prevents accesses to the protected random access memory by elements other than the read only memory; and a hardware-based timer, wherein the security logic prevents accesses to the hardware-based timer by elements other than the read only memory.

33. The system claimed in claim 32, wherein accesses to the protected random access memory pursuant to instruction code in the read only memory can only take place when the system is in a supervisory mode.

34. An electronic device comprising:

a microprocessor; and a memory;

wherein the microprocessor performs a hash calculation on contents of the memory to derive an audit hash value, which audit hash value is compared to a valid hash value previously derived from performance of the hash calculation on authentic memory contents, said hash calculation and comparison being secure from tampering.

35. The electronic device claimed in claim 34, wherein the audit hash value is periodically derived and compared to the valid hash value.

36. The electronic device claimed in claim 35, wherein the selected contents include microprocessor programming code.

37. The electronic device claimed in claim 34, wherein the memory includes a flash memory and an EEPROM.

38. The electronic device claimed in claim 37, wherein the audit hash value derived based on selected contents of the flash memory and the EEPROM.

39. The electronic device claimed in claim 34, wherein the valid hash value is authenticated using a public key stored within the memory.

40. The electronic device claimed in claim 34, wherein the valid hash value is given a digital signature using a private key.

41. The electronic device claimed in claim 40, wherein a public/private key system used is selected from the group of public key algorithms consisting of: ELGAMAL, RSA, DSA, Fiege-Fiat-Shamir, and Fiat-Shamir.

42. The electronic device claimed in claim 34, wherein the hash calculation performed is selected from the group of hash functions consisting of: Snerfu, H-Hash, MD2, MD4, MD5, Secure Hash Algorithm (SHA), and HAVAL.

43. In an electronic device, a method for detecting memory tampering, the method comprising the steps of:

storing a signed valid hash value produced by performing a hash calculation on selected contents of a memory which memory selected contents are known to be authentic;

producing an audit hash value by performing the hash calculation on the selected contents of the memory; and comparing the audit hash value to the valid hash value, whereby a difference between the audit and the valid hash values indicates alteration of the selected memory contents, wherein the steps of storing, producing, and comparing are secure from tampering.

44. The method claimed in claim 43, further including the step of:

signing the valid hash value with a digital signature based on a private key.

45. The method claimed in claim 43, wherein the steps of producing the audit hash value and of comparing the audit and valid hash values are performed periodically.

46. The method claimed in claim 43, wherein the step of producing the audit hash value involves calculating audit hash value segments.

47. The method claimed in claim 46, wherein calculation of an audit hash value segment can be delayed as necessary while other processes occurring within the electronic device are completed.

48. The method claimed in claim 43, wherein the valid hash value is given a digital signature, and wherein the step of comparing the audit hash value to the valid hash value includes the step of authenticating the valid hash value against the signature.

49. A system for preventing memory access, said system comprising:

security logic a read only memory containing instruction code;

protected random access memory;

wherein the security logic prevents accesses to the protected random access memory by elements other than the read only memory; and a hardware-based timer, wherein the security logic prevents accesses to the hardware-based timer by elements other than the read only memory.

50. The system claimed in claim 49, wherein accesses to the protected random access memory pursuant to instruction code in the read only memory can only take place when the system is in a supervisory mode.

* * * * *